United States Patent [19]

Hershey et al.

[11] Patent Number: 5,381,445
[45] Date of Patent: Jan. 10, 1995

[54] MUNITIONS CARTRIDGE TRANSMITTER

[75] Inventors: John E. Hershey, Ballston Lake, N.Y.; Menahem Lowy, Arlington, Tex.; Lionel M. Levinson, Schenectady, N.Y.; Amer A. Hassan, Clifton Park, N.Y.; Richard L. Frey, Delanson, N.Y.; Kenneth B. Welles, II, Scotia, N.Y.; Michael Gdula, Knox, N.Y.; Robert J. Wojnarowski, Ballston Lake, N.Y.

[73] Assignee: General Electric Company, Schenectady, N.Y.

[21] Appl. No.: 55,473

[22] Filed: May 3, 1993

[51] Int. Cl.⁶ .................... F42B 12/36; H04L 27/30
[52] U.S. Cl. ...................................... 375/1; 380/34; 89/1.11; 102/211; 102/214; 102/501; 102/503; 455/98; 342/68; 73/167
[58] Field of Search .................. 244/3.19; 89/1.11; 73/167; 102/211–214, 501, 503; 342/62, 63, 68; 455/98; 375/1; 380/34

[56] References Cited

U.S. PATENT DOCUMENTS

| | | | |
|---|---|---|---|
| 3,305,636 | 2/1967 | Webb | 375/1 X |
| 3,419,861 | 12/1968 | Resnik et al. | 342/68 |
| 3,665,472 | 5/1972 | Kartchner et al. | 375/1 X |
| 3,761,817 | 9/1973 | Kaltschmidt et al. | 375/1 X |
| 3,930,448 | 1/1976 | Barber et al. | 102/348 |
| 4,059,052 | 11/1977 | Karr | 102/214 |
| 4,170,008 | 10/1979 | Goebel et al. | 342/68 X |
| 4,783,695 | 11/1988 | Eichelberger et al. | 257/668 |
| 4,835,704 | 5/1989 | Eichelberger et al. | 364/490 |
| 4,894,115 | 1/1990 | Eichelberger et al. | 156/643 |
| 4,933,042 | 6/1990 | Eichelberger et al. | 156/239 |
| 5,161,093 | 11/1992 | Gorczyca et al. | 361/785 |
| 5,192,827 | 3/1993 | Jasper, Jr. | 89/1.11 |
| 5,218,614 | 6/1993 | Magorian | 102/214 |

OTHER PUBLICATIONS

"Random and Pseudorandom Sequences," J. Hershey, R. Yarlagadda, Data Transporation and Protection, 1986, Chapter 8, pp. 259–310.
"System Revolutionizes Surveying and Navigation," J. Gallant, EDN, Jan. 7, 1993, pp. 31–42.
"Pulse Compression Radar," EC Farnett, George H. Stevens, Radar Handbook, 1990, 2nd edition, Chapter 10, pp. 10.1–10.39.
"Classification of Reserve Batteries," D. Linden, Handbook of Batteries and Fuel Cells, 1984, pp. 33-4–33-10.
"Thermal Batteries," F. Tepper, D. Yalom, Handbook of Batteries and Fuel Cells, 1984, pp. 40-1–40-18.

*Primary Examiner*—Bernarr E. Gregory
*Attorney, Agent, or Firm*—Enrique J. Mora; Marvin Snyder

[57] ABSTRACT

A munitions cartridge transmitter capable of emitting an electromagnetic signal after discharge from a cartridge propelling device comprises a signal generator, an electromagnetic signal transmitter coupled to the generator, an antenna coupled to the transmitter, and a hollow cartridge for housing the generator, the transmitter, and the antenna. The transmitter is energized after discharge of the cartridge propelling device by a power source contained in the cartridge.

25 Claims, 3 Drawing Sheets

MUNITIONS CARTRIDGE TRANSMITTER

FIELD OF THE INVENTION

The invention is generally directed to radio transmitters, and more particularly, to a munitions cartridge transmitter such as for use in an emergency alerting and locating system.

BACKGROUND OF THE INVENTION

In many common situations, a need exists for individuals out in "the field," such as law enforcement officers, foresters, hunters, or mountain climbers, to both signal for assistance and to report a position. Several systems or techniques are available to accomplish this result. These include a flare and a flare gun, although such devices have limited usefulness due to both the range and accuracy attainable. Likewise, conventional radio transmitters and receivers are available; however, these suffer from disadvantages such as weight, limited range, and also lack of precision in the position reported, if any. Thus, a need exists for a convenient and transportable device or a method for providing a signal for emergency assistance that also provides the position from which the signal was emitted accurately and to a high degree of precision, such as within a few hundred feet.

SUMMARY OF THE INVENTION

One object of the invention is to provide an emergency alerting and locating system including a munitions cartridge transmitter capable of emitting an electromagnetic signal after discharge of the cartridge from a cartridge propelling device.

Briefly, in accordance with one embodiment of the invention, a munitions cartridge transmitter capable of emitting an electromagnetic signal after discharge from a cartridge propelling device comprises: a signal generator, an electromagnetic signal transmitter coupled to the generator, an antenna coupled to the transmitter, and a hollow cartridge for housing the generator, the transmitter, and the antenna.

BRIEF DESCRIPTION OF THE DRAWINGS

The subject matter regarded as the invention is particularly pointed out and distinctly claimed in the concluding portion of the specification. The invention, however, both as to organization and method of operation, together with further objects and advantages thereof, may best be understood by reference to the following detailed description when read with the accompanying drawings in which:

DETAILED DESCRIPTION OF THE INVENTION

Figure 1:
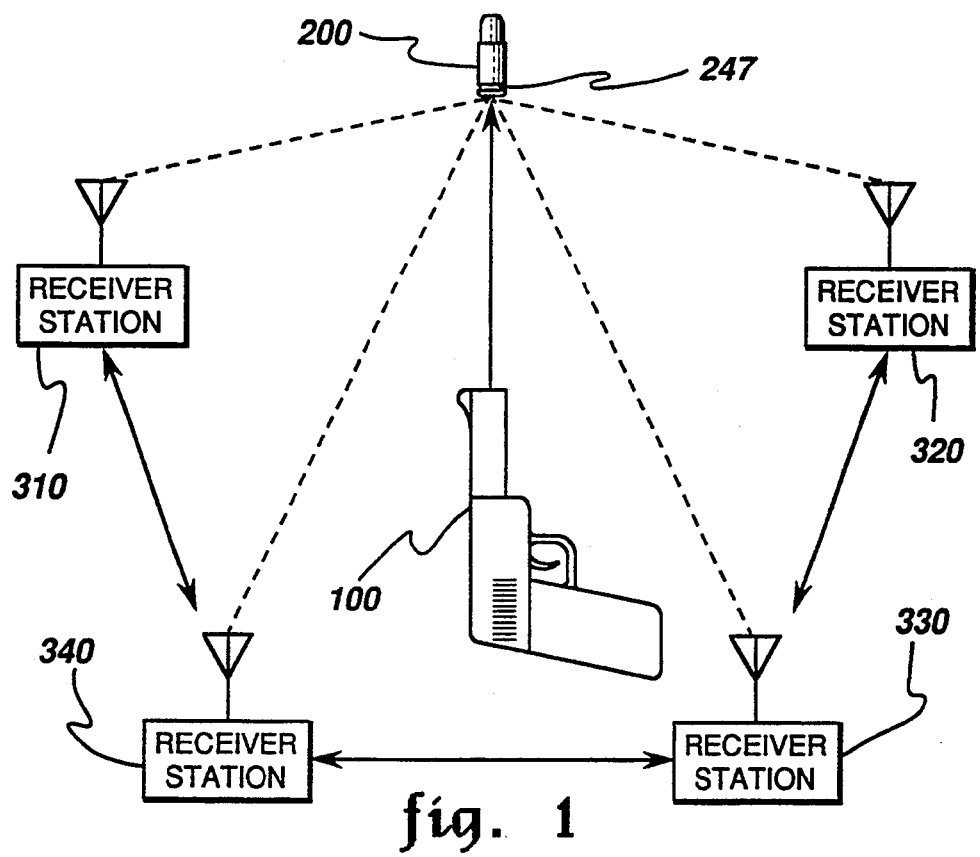
FIG. 1 is a diagram illustrating an emergency alerting and locating system including an embodiment of a munitions cartridge transmitter in accordance with the invention.

FIG. 1 illustrates an emergency alerting and locating system including a munitions cartridge transmitter 200 capable of emitting an electromagnetic signal after discharge from a cartridge propelling device 100, such as a conventional gun or hand-held firearm. In the context of the invention, the term "cartridge" refers to the housing or protective casing for the components of a munitions cartridge transmitter in accordance with the present invention. Thus, the cartridge may comprise, for example, a hollowed bullet, a hollowed shotgun shell, or another protective shell in the shape of a projectile commonly employed in hand-held munitions. Likewise, it may include a 30 or 40 millimeter casing or housing, such as commonly used with conventional flares.

FIG. 1 illustrates four respective receivers or receiver stations 310, 320, 330, and 340, which may receive an electromagnetic signal emitted by the munitions cartridge transmitter and, based upon the signal received, determine to a high degree of accuracy and precision the location from which the signals were emitted and, hence, the approximate position from which the cartridge was propelled or fired. It will be appreciated that cartridge 200 does not illustrate a trailing antenna that may be deployed after discharge of the munitions cartridge transmitter from the cartridge propelling device.

Figures 3A, 3B:
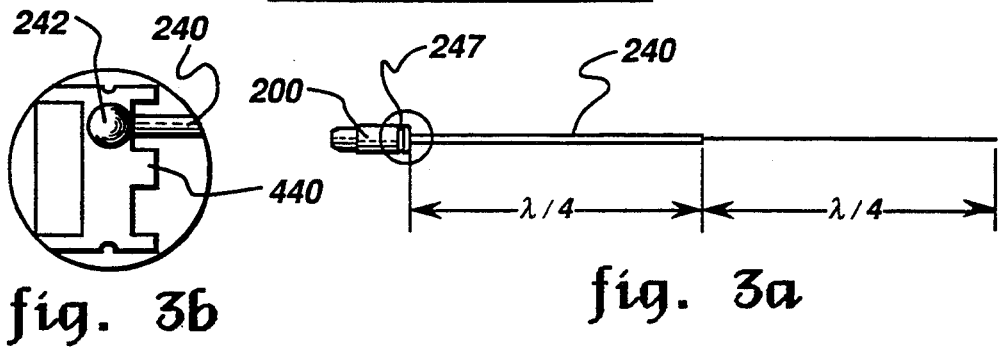
FIGS. 3a and 3b are, respectively, diagrams illustrating one embodiment of a deployable antenna for a munitions cartridge transmitter in accordance with the invention.
Figure 4:
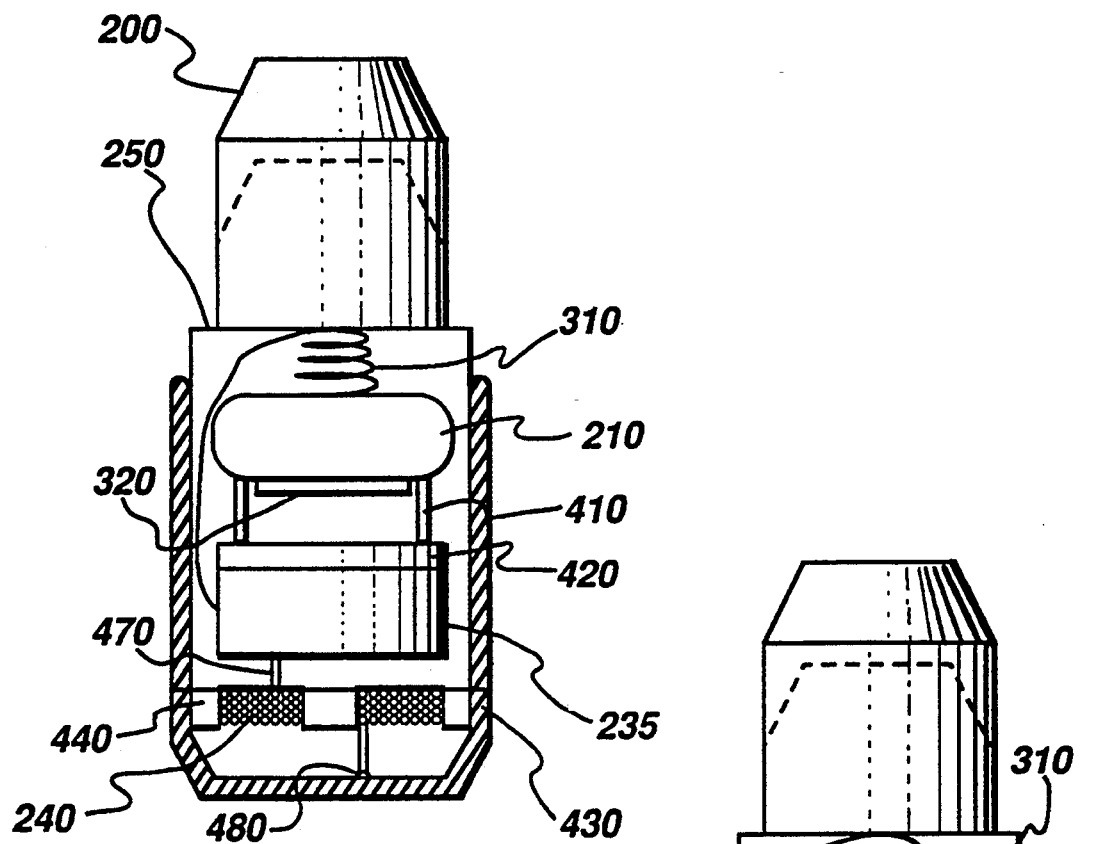
FIG. 4 is a side view illustrating one embodiment of a munitions cartridge transmitter in accordance with the invention before discharge from a cartridge propelling device.

FIG. 4 illustrates the component parts of one embodiment of a munitions cartridge transmitter in accordance with the invention before discharge from a cartridge propelling device. FIG. 4 illustrates a power supply 210, such as a battery capable of providing electrical energy after discharge of the cartridge from the cartridge propelling device 100. In the embodiment illustrated in FIG. 4, power supply 210 may provide electrical energy after discharge by being coupled to other components of the munitions cartridge transmitter, explained in more detailed hereinafter. Typically, a munitions cartridge transmitter in accordance with the invention will include a signal generator, such as a digital sequence generator, and a transmitter; however, these are illustrated for this embodiment as a single component 235, such as a multi-chip module or a single monolithic integrated circuit chip. Thus, a munitions cartridge transmitter in accordance with the invention may include a signal generator comprising a digital sequence generator for providing a digital sequence signal for use by the receiver stations to determine to a high degree of accuracy and precision the location from which the signal was emitted. Likewise, a munitions cartridge transmitter in accordance with the invention may include an electromagnetic signal transmitter, coupled to the signal generator within component 235, for emitting or transmitting the signal provided by the signal generator. FIG. 4 further illustrates an antenna 240 coupled to the transmitter and capable of being deployed after discharge of cartridge 200 from cartridge propelling device 100. As illustrated, before discharge antenna 240 is stored or coiled in the bobbin shaped end 440 of a hollow cartridge housing 250. It will likewise be appreciated that the outer surface of housing 250 towards end 440 may or may not comprise a substantially even surface or "straight" casing depending upon the particular embodiment. Thus, a conventional "notch" 247 commonly employed in munitions projectiles, such as illustrated in FIGS. 1 and 3a, may be added. FIG. 4 also illustrates the hollow cartridge housing 250 for containing the power supply, the signal generator, the electromagnetic signal transmitter, and the antenna. A conventional sabot jacket 430 in direct physical contact with a portion of the outer surface of housing 250, described in more detail hereinafter, is likewise illustrated.

Figure 2:
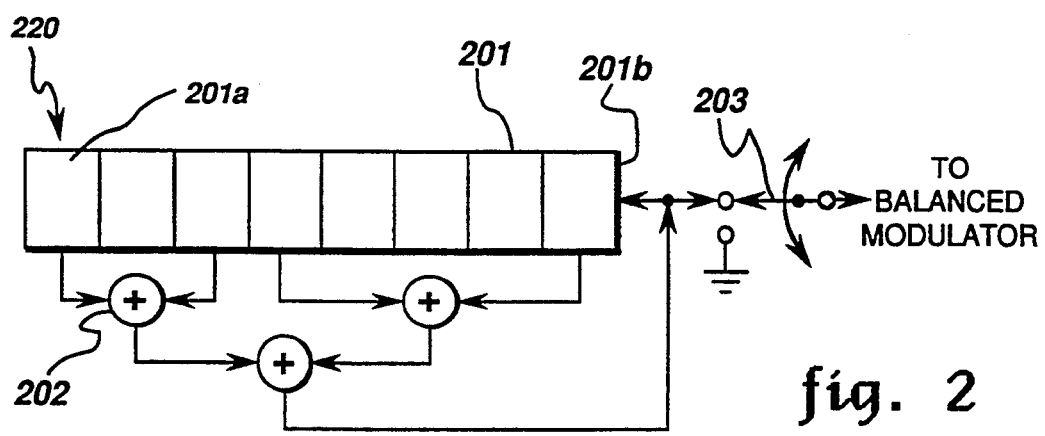
FIG. 2 is a schematic diagram illustrating an embodiment of a digital sequence generator for use in a munitions cartridge transmitter in accordance with the invention.
Figure 6:
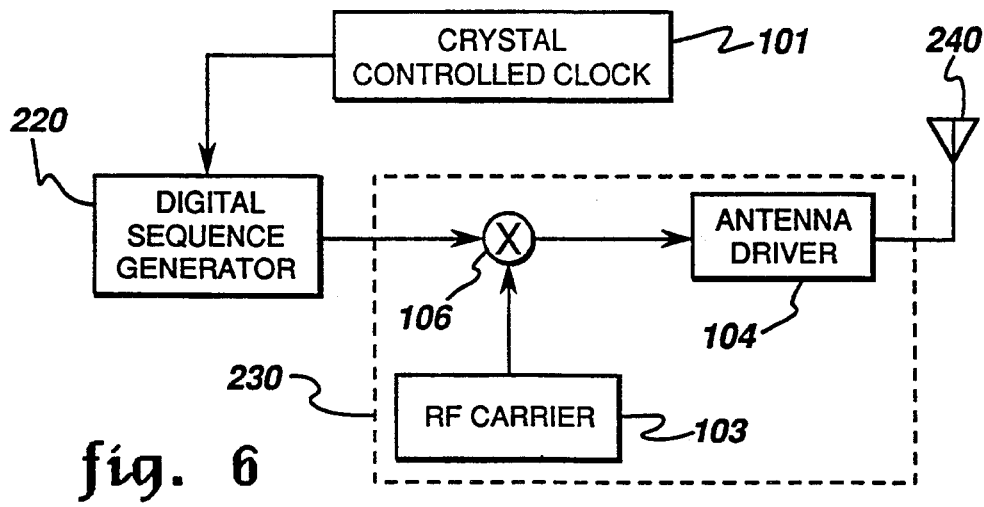
FIG. 6 is a block diagram illustrating an embodiment of an electromagnetic signal transmitter for use in a munitions cartridge transmitter in accordance with the invention.
Figure 7:
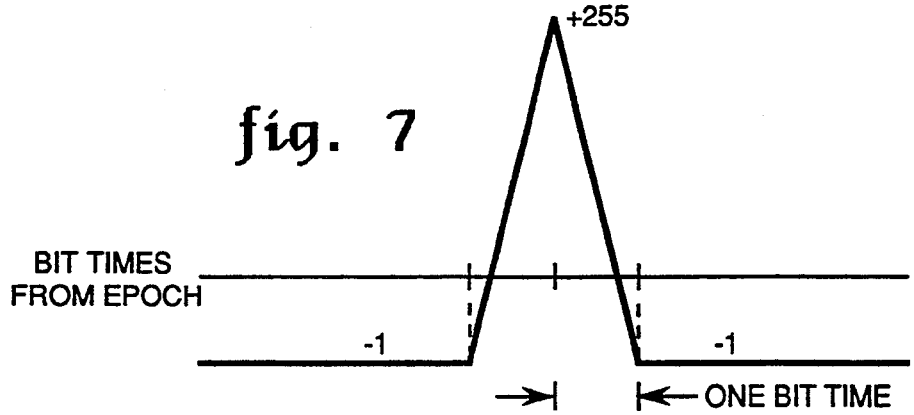
FIG. 7 is a diagram showing the results of an autocorrelation that may be performed by a receiver capable of receiving a signal emitted by an embodiment of a munitions cartridge transmitter in accordance with the present invention.

FIG. 2 illustrates an embodiment of a signal or digital sequence generator 220 such as may be incorporated in an embodiment of munitions cartridge transmitter 200 in accordance with the invention. Nonetheless, the invention is not restricted in scope to use of a digital sequence generator. Any signal generator capable of generating either a digital sequence or an analog signal may provide satisfactory operation in the context of the invention. Generally, any signal having a time domain representation suitable for resolution in time of the signal will suffice. Typically, signals having properties suitable for such time resolution comprise those signals whose power spectral density is relatively flat over a predetermined range of relevant frequencies. It will be appreciated that the relevant frequency range generally depends upon the bandwidth of the signal waveform, which is related to the clock rate of the generator. Thus, for example, in this particular embodiment in which the clock rate is 1 megahertz, as illustrated in FIG. 6, the relevant range of frequencies is on the order of 1 or 2 megahertz. As illustrated in FIG. 2, in this particular embodiment comprising a digital sequence generator, the generator comprises a conventional shift register 201 including in this particular embodiment eight stages, such as stage 201a, all of which are initialized to a "logical one" upon receiving electrical energy from power supply 210. Feedback circuitry digitally coupled to register 201 comprises a "tree" of modulo-two adders or exclusiveors, such as illustrated by logic gate 202, which implements a "primitive" polynomial resulting in the generation of a pseudorandom sequence. In this particular embodiment the length of the sequence is $2^8-1$ or 255 steps. As illustrated, upon receiving electrical power, the shift register stages and feedback circuitry comprising logical gates produce binary signals in response to clock pulses. The output signal of the feedback circuitry is provided to a switch 203, such as a time-controlled switch, and fed back to register 201 at stage 201b to result in the generation of the pseudorandom sequences. It will likewise be appreciated that the invention is not limited in scope to this particular method or device for generating a digital sequence. As will be appreciated by one skilled in the art, the sequence has a circular autocorrelation function. Thus, as illustrated in FIG. 7, the autocorrelation at "lag" zero will be 255, whereas the autocorrelation at any other integer "lag" or offset will be −1. One advantage of such a generator is obtained through what is commonly termed "pulse compression." This provides the receiver stations the capability to determine the position from which the signal was emitted (and hence to substantially determine the location at which the munitions cartridge transmitter was fired) to a high degree of accuracy and precision.

In a digital sequence generator 220 capable of generating m-sequences, as shown in FIG. 2, gate 202 is part of a three exclusive- or "tree" that is coupled to the shift register to form or generate the "primitive" polynomial. This "primitive" polynomial generating feedback circuitry coupled to the 8-stage shift register will ensure existence of a cycle of maximum length 255 bits (an "m-sequence") with a two-valued autocorrelation function. The extant literature on "primitive" polynomials and m-sequences is well-known. See, for example, Chapter 8 of *Data Transportation and Protection*, (1986) available from Plenum Press, by J. Hershey and R. Yarlagadda, herein incorporated by reference.

Time-controlled switch 203 allows the output signal from m-sequence generator 220 to be passed or transmitted to a balanced modulator 106, illustrated in FIG. 6, or sets the output signal of the m-sequence generator to logical zero. The switch operation depends on the particular embodiment. In one embodiment, switch 203 may be set so that the output signal of the generator is always sent or transmitted to the balanced modulator. In another embodiment, switch 203 may be set to logical zero for a period of time after firing or propelling cartridge and then set to pass or transmit the m-sequence to the modulator, as explained in more detail hereinafter.

In this particular embodiment, as illustrated in FIG. 6, digital or m-sequence generator 220 is "clocked" at a rate slightly greater than a one megahertz frequency. Thus, the full sequence will take slightly more than 244 microseconds. In conjunction with electromagnetic signal transmitter 230, described hereinafter, this should provide an "unambiguous range" of about 45 miles in free space, the approximate distance traveled by the electromagnetic wave during the full cycle of the m-sequence. Furthermore, this unambiguous range may be increased dramatically by adding circuitry to delay the m-sequence after a predetermined number of m-sequences are emitted. For example, in this particular embodiment, after 32 m-sequences are emitted, the munitions cartridge transmitter may pause, such as for 2 "bit times," before emitting another 32 m-sequences. The receivers, which determine location based on a Time Difference of Arrival (TDOA) algorithm described hereinafter, may use the "2 bit time" time shift or time delay as a reference for removing range ambiguity. In this particular embodiment, this would have the desirable effect of increasing the unambiguous range from approximately 40 miles to over 1,000 miles.

FIG. 6 likewise schematically illustrates transmitter 230 coupled to digital sequence generator 220. The transmitter may transmit in the VHF frequency band, although it will be appreciated that the invention is not limited in scope to this particular frequency range. Likewise, the digital sequence generator output signal is provided to balanced modulator 106 and a driver 104 incorporated in transmitter 230 to provide a transmittable electromagnetic signal.

The components of transmitter 230 shown in FIG. 6 are now discussed in greater detail. A clock, such as crystal controlled clock 101, produces a clock rate on the order of 1 Megahertz (MHz). "M-sequence" generator 220 produces a periodic pseudorandom sequence of "ones" and "zeros." The generator may, as previously discussed, have, in some embodiments, a time-controlled switch which initially suppresses the output signal of the m-sequence generator if the output signal from generator 220 is a logical zero. Ultimately, the generator signal is provided to balanced modulator 106 and modulated in accordance with a radio frequency (RF) carrier 103, as illustrated. Balanced modulator 106 may invert the carrier, i.e., effectively introduce a phase delay of 180 degrees, if the output signal from 220 is a logical one. In one embodiment of a balanced modulator for incorporation in a munitions cartridge transmitter in accordance with the invention, a conventional sine wave, of a predetermined frequency f, may be applied to one input leg or port of the balanced modulator, to pass through the modulator with zero phase change provided that a specific DC level, such as $V_0$ volts, is applied to a second leg or port. The sine wave of frequency f may then be phase delayed approximately 180° by the modulator if another DC level, such as $V_\pi$ volts, is applied to the second port. The balanced modulator design will depend at least in part on the surrounding circuitry, however, a "Gilbert cell" design provides one conventional embodiment. This VLSI circuit is based on "A DC-500 MHz Amplifier/Multiplier Principle," by B. Gilbert, a paper delivered at the International Solid State Circuits Conference, Feb. 16, 1968, and herein incorporated as a reference.

RF carrier 103 may be implemented in a number of ways. One implementation comprises a simple resistor-capacitor (RC) circuit with an active device, such as an operational amplifier. The RF carrier may also be created by using a crystal operating in an overtone mode at about 75 MHz and multiplying, by twice squaring, the frequency to 300 MHz. Other embodiments are described in conventional electrical engineering textbooks, such as *Information, Transmission, Modulation and Noise*, (1980) by Mischa Schwartz, available from McGraw-Hill Book Company, or *Principles of Communication* (1970) by R. Ziemer and W. Trantor, available from Houghton Mifflin Co, both of which are herein incorporated by reference.

Conventional antenna driver 104 comprises a conventional RF amplifier and antenna coupler. The antenna coupler may comprise a conventional impedance matching network designed to efficiently transfer energy to the antenna to radiate the electromagnetic signals. Such impedance matching networks are well-known in the communications art. Some techniques and design practices are described in *The Radio Amateur's Handbook* (1977) published by the American Radio Relay League, Inc. Antenna 240 is described in more detail hereinafter.

The receivers or receiver stations may comprise matched filters centered at the transmitter frequency. Likewise, the receiver may be realized by various embodiments. Because components are expected to age and also may exhibit other variations, it is desirable for the receivers to have the capability to tolerate some variability in the received signal without a substantial degradation in performance. Thus, for one embodiment, it is assumed that the transmitter continually transmits the m-sequence and the receiver searches for the incoming m-sequence by continually performing a crosscorrelation using a sliding correlator, i.e., a correlator that crosscorrelates the incoming signal against the reference but at a slightly offset rate such that the correct alignment will be found within a reasonable time despite the presence of clock drift, such as produced by aging, within predetermined component tolerances in the transmitter. Once the m-sequence has been detected, this "coarse search" is terminated and the receiver enters a fine averaging mode in which it attempts to correctly measure the m-sequence referenced epoch within a tenth of a bit.

In a second embodiment, the transmitter is assumed to have switch 230 set to logical zero for a short duration. This causes the transmitter to emit a sinusoidal carrier at the center frequency. The receiver searches for such a carrier, locks onto it, and then waits for switch 203 to allow the m-sequence to be transmitted by transmitter 230. Once this begins, the receiver operates as previously described and makes its coarse and fine measurements. It may be desirable to initially suppress the output signal from the m-sequence generator by setting the input signal to balanced modulator 106 from the m-sequence generator to either $V_0$ or $V_\pi$ volts, as previously described. This would allow the receivers to initially acquire the sine wave waveform and thereby accurately estimate the center frequency of the sequence spread spectrum signal to be received. As described, such a technique would be useful if the digital signal generator components are expected to exhibit frequency drift due to aging or for other reasons.

One aspect of the emergency alerting and locating system is the transfer of a time measurement or signal available using GPS, the global positioning system, such as described in "System Revolutionizes Survey and Navigation," by John Gallant, published in *EDN*, Jan. 7, 1993, pp. 31–42, and herein incorporated by reference. The receiver provides the capability to synchronize signals and determine the position of munitions cartridge transmitter 200 after firing by having or acquiring data regarding the positions of various satellites emitting wideband pseudonoise-coded signals and by recovering the phase of the pseudorandom sequence provided by digital sequence generator 220. Use of GPS offers additional advantages, such as the capability of determining position to a high degree of accuracy and position in a variety of different environments, such as at sea or in a desert. Alternatively, Rubidium or Cesium Time Standards synchronized to National Bureau of Standards Transmitters WWV or WWVH may be used for time measurement purposes.

The receiver stations may link to a central processing center or, as illustrated in FIG. 1, may link to each other. Thus, the readings from four different receiver stations will determine the location of the transmitter by a timed difference of arrival (TDOA) algorithm. This method assumes that for a set of four or more receivers, each receiver determines the time at which it individually receives a particular signal. These times are communicated to a central processing facility which locates the transmitter by solving for that point which will provide the different relative times of arrival of the signal to the various receivers.

Figure 8:
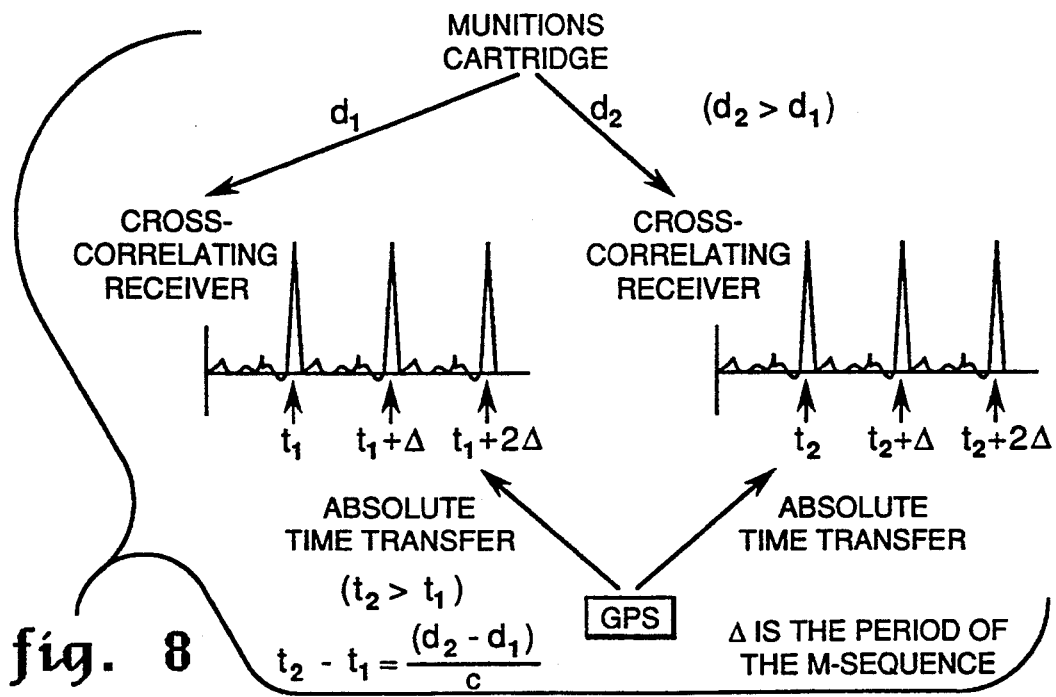
FIG. 8 is a diagram illustrating the Time Difference of Arrival (TDOA) technique that may be performed by a set of receivers capable of receiving a signal emitted by an embodiment of a munitions cartridge transmitter in accordance with the present invention.

In more detail, the receiver determines first that an emergency signal is present or has been emitted by a munitions cartridge transmitter in accordance with the invention. The receiver then determines the periodic times when the repeating m-sequence passes through the same point on its cycle. The receiver determines this point by the conventional pulse compression technique of crosscorrelating the received m-sequence against a fixed replica of the m-sequence. When the phase of the incoming m-sequence aligns with the stored replica, the crosscorrelation function reaches its maximum value. The crosscorrelation of a 255 bit m-sequence with a stored replica of itself, computed over an entire 255 bit period, is depicted in FIG. 7. The epoch would be the time at which the maximum crosscorrelations are noted. The receiver "locks" to these epochs and reports the time of epoch occurrence relative to known time which has been transferred through the GPS (or other time standard) time transfer system to the individual receivers. This is illustrated in more detail in FIG. 8. As illustrated, the crosscorrelation peaks will be noted at different times at the different receivers depending upon the respective distances from the cartridge to the different receivers. This will permit calculation of the position from which the signal was emitted by known techniques to a high degree of precision and accuracy. Likewise, it will be appreciated that firing more than one munitions cartridge transmitter within a relatively short period of time may enhance the capability to determine position by a TDOA algorithm and thereby increase the possibility of successful emergency alerting and locating. For more background on pseudonoise crosscorrelation or "pulse compression" see Chapter 10 of *Radar Handbook*, 1990, 2nd edition, Merrill Skolnik, ed., available from McGraw-Hill Book Co., which is herein incorporated by reference.

Based on various assumptions regarding the power transmitted, the transmitting antenna gain, the distance to the receiver, the receiving antenna aperture, the post-correlation bandwidth, and various system and processing losses, the anticipated signal to noise ratio from the correlator correctly aligned with a transmitted wideband signal is expected to be more than a few decibels. Likewise, based on the signals emitted, received, and processed, the motion of the munitions cartridge transmitter may be tracked for improved position determination. It will now be appreciated that some of the advantages obtained from the use of a wideband signal include a sharp autocorrelation function for highly accurate and precise positioning, resistance to various frequency selective fading mechanisms, resistance to interfering signals, and the capability to assign particular digital sequence "polynomial" sequences to specific groups, such as law enforcement agencies. Likewise, the possibility of conveying additional information by the selection of a particular polynomial may also result from the use of a wideband signal.

Another aspect of the invention is packaging the electronics for the digital sequence generator and the transmitter, as well as the power supply and the antenna, within cartridge housing 250, which will substitute for a bullet, slug, or other projectile in a cartridge propelling device, such as a firearm. Once embodied in a housing typically a reduced powder charge should be adequate to propel the cartridge well above the land so long as the charge is sufficient to actuate the propelling device in those devices that depend on the charge for such device actuation. As it travels to its zenith, the cartridge shall typically have the capability to deploy a trailing antenna, such as a twin lead or small coaxial cable, the latter being illustrated in FIGS. 3a and 3b, respectively. By having one of the two conductors extend a quarter wavelength and the other extend a half wavelength, the antenna will operate like a center fed dipole at half wavelength. Thus, for example, at a center operational frequency of approximately 300 MHz frequency, the antenna would be approximately 0.5 meters long. It will be appreciated that the length of the antenna will depend upon the transmitter center frequency. The antenna may be physically attached and electrically coupled to the cartridge housing, as indicated in FIG. 3b, by using a miniaturized electrically conducting rotating bearing 242. This should provide stress relief if the bullet spins about its major axis. The miniaturized electrically conducting bearing may be constructed in a variety of ways, such as using small droplets of Mercury in conjunction with a metal ball rotatably mounted in a metal socket or another type of slip housing, such as a wire slidably connected by tension or bias to an electrically conducting surface to provide electrical conduction between the rotating or sliding conductors and the cartridge.

Practical problems regarding deployment of the antenna may be avoided or reduced by using signals approximately in the range conventionally considered to be very high to ultra high frequency signals. Furthermore, while an antenna may be coupled to the transmitter, in alternative embodiments of a munitions cartridge transmitter in accordance with the invention, it may not necessarily need to be deployable for satisfactory operation. For example, in addition to selecting a very high or ultra high frequency for the signals being emitted, it may be possible to obtain satisfactory operation without providing an impedance matched antenna. In particular, the height achieved by a munitions cartridge transmitter in accordance with the invention after discharge may affect reception of the emitted signal due to line of sight considerations. In this situation, it may not be necessary to impedence match the antenna to obtain satisfactory operation and it may prove sufficient to couple the transmitter to a relatively short antenna that is not deployable after discharge, such as an antenna comprising metal applied to or printed on fiberglass, plastic, or another sturdy material.

FIG. 4 illustrates one embodiment of a cartridge having a typical nine millimeter round size. It will nonetheless be appreciated that the invention is not limited in scope to a nine millimeter round sized cartridge. Other standard or nonstandard sized projectiles may be employed including various shotgun gauge sizes, such as 12 gauge or 20 gauge, or other shell sizes typically discharged from hand-held weapons larger or smaller than a 9 millimeter round size. As will be appreciated, it is desirable but not necessary that the cartridge conform to the dimensional specifications of a conventional bullet. One advantage of the use of conventional sized shotgun shells as a hollow cartridge housing is the reduction and potential elimination of rotation of the cartridge about its primary or major axis after discharge from the cartridge propelling device. Alternatively, an advantage of the use of a nonstandard sized caliber projectile as a cartridge housing is to make the munitions cartridge transmitter visually distinguishable from conventional munitions and thereby reduce or eliminate errors occurring during actual use due to similarities with conventional munitions. It will likewise be appreciated that the cartridge may be shortened or extended in length to accommodate the electronics and power source without widening the cartridge illustrated in FIG. 4 in phantom, thus making it capable of being received by a conventional gun chamber. Nonetheless, use of conventional sized projectiles or bullets as housing for the munitions transmitter cartridge in accordance with the invention is desirable so that it may be employed with conventional hand-held firearms, such as hand-held or automatic weapons utilizing clips. As illustrated in FIG. 4, for a nine millimeter round sized cartridge the projectile diameter may be 0.3940 inches at a first end and 0.380 inches at the opposite end. Likewise, the overall length in a standard cartridge may vary from 1.040 to 1.105, such as described in *Hornady Handbook of Cartridge Reloading*, available from Hornady Manufacturing Company (1980), herein incorporated by reference.

The cartridge may be propelled by either a conventional powder charge or by a rocket propulsion system. Likewise, a hybrid approach may also be employed. The hybrid approach would typically use an initial powder charge which may be smaller in size than a conventional powder charge to provide an initial velocity to the cartridge. The combustion of this initial charge may also be used to ignite a solid fuel "rocket" propellent material which may be housed in the base of the cartridge to sustain or extend the time of flight of the cartridge, providing for improved elevation, and thereby enabling a longer period of time for receiver tracking. It will be appreciated that a means of protection between the cartridge and the propellant is desirable, such as a metal barrier or a barrier made of another heat resistant material. Assuming rocket propellent, the weight of the projectile should be for a 9 mm sized cartridge approximately 90–154 grains, where 7000 grains constitutes 1 pound. Likewise, the housing of the power supply, generator, transmitter, and antenna may be made of a material other than the conventional metals used for firearms, but nonetheless, suitable to protect the cartridge components from damage, such as a protective polymer or alloy.

Figure 5:
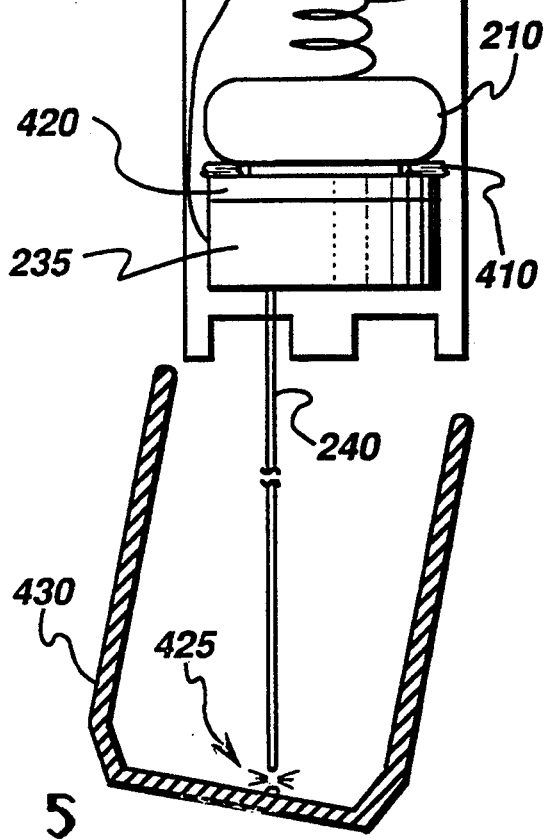
FIG. 5 illustrates the embodiment of FIG. 4 after discharge from a cartridge propelling device.

FIGS. 4 and 5 illustrate an embodiment of the invention including a deployable antenna 240. In FIG. 4 the cartridge housing is shown partially cutaway for clarity. In this particular embodiment, means for insulating at least one electrode of power supply 210 from the transmitter and signal generator embodied in component 235 until after discharge of the cartridge from the cartridge propelling device is provided, as described in more detail hereinafter. Nonetheless, it will be appreciated that the invention is not restricted in scope to this particular embodiment or this particular insulating means. For example, alternative power supplies electrically coupled to the generator and the transmitter and adapted to provide electrical energy after discharge of the cartridge from the cartridge propelling device, such as the reserve battery configurations described hereinafter, may be employed. A small battery or power supply 210 is held in place between an electrically conductive spring 310 and crushable or collapsible ring or doughnut-shaped spacer 410. As illustrated, spring 310 is in physical and electrical contact with component 235 incorporating transmitter 230 and signal generator 220, shown in FIG. 6, as previously described. The spacer may comprise an electrically insulating ring of nonresilient material, such as nylon, Ultem ® synthetic resin (available from General Electric Company, Pittsfield, Mass.), or a Teflon ® synthetic resin (available from E.I. dupont deNemours and Company, Wilmington, Del.)-coated hollow metal toroid. The spacer positions or holds positive electrode 320 in place away from contact 420, preventing a complete electric circuit from being formed before firing the cartridge. It will be appreciated that the spring and space combination should have sufficient force to substantially lodge the battery in place so as to avoid completing the electrical circuit in the presence of ordinary vibrations and other motion associated with handling the cartridge before discharge. The bottom or opposite end 440 of the cartridge forms a small bobbin shape. A length of thin, strong electrically conducting wire or cable, such as previously described in conjunction with FIGS. 3a and 3b, is electrically connected at one end to the transmitter. The wire is mechanically connected at that same end to the bobbin, as indicated by 470. The antenna wire is coiled within the bobbin and mechanically attached at the other end of the wire to a casing or wadding material 430, such as a conventional sabot or sabot jacket. Sabot jackets are well-known in the munitions art. A conventional sabot or sabot jacket is described in Chapter 2 of *Cartridges of the World*, available from Hornady Manufacturing Company, herein incorporated by reference. Likewise, a number of sources for a sabot or sabot jacket, such as may be incorporated in a munitions cartridge in accordance with the invention, exist, such as Remington Arms Corporation in Ilion, N.Y., Federal Cartridge Co. in Anoka, Minn., U.S. Repeating Arms Corporation in New Haven, Conn., Hornady Manufacturing Company in Grand Island, Nebraska, and others. The point 480 of mechanical attachment to the casing is weakened relative to the attachment to bobbin 470. It will be appreciated that some embodiments of a munitions cartridge transmitter in accordance with the invention, such as housed within a shotgun shell, may not rotate or spin much, if at all, after being propelled. However, in those embodiments in which spin or rotation of the housing after discharge is contemplated, the antenna wire should be coiled so as to accommodate the spin and reduce antenna deployment problems, such as knotting.

When the cartridge is fired, the inertia of the battery and the acceleration of the cartridge combine to mechanically deform or crush insulating spacer 410, as illustrated in FIG. 5. The battery then makes physical and electrical contact with the transmitter package. The insulating spacer is nonresilient, so when the acceleration of the cartridge substantially ceases, the battery is retained against contact 420 by the bias of retaining spring 310. The spring provides enough force to maintain a completed electronic circuit even while the cartridge decelerates due to air resistance. Completion of the electric circuit powers transmitter 230 which emits the coded signal after the cartridge is discharged and the battery is coupled to component 235.

As the cartridge leaves the barrel of the gun, sabot casing or jacket 430 becomes detached from the cartridge upon deployment or ejection from the propelling device due at least in part to the air flow around the cartridge. As the casing falls away, it pulls the coiled antenna wire or cable from the bobbin shaped end 440 of the cartridge. The casing and the air drag on the partially deployed antenna wire likewise cause the rest of the antenna wire or cable to be deployed. The casing breaks off from the antenna at the mechanical "weak link," indicated by 425 in FIG. 5. This prevents the weight of and drag on the sabot from ripping the antenna from the cartridge. The cartridge continues its trajectory with the antenna substantially deployed and transmitting the coded signal.

Yet another aspect of the invention is adapting the miniaturized electronics to be substantially unaffected by a high acceleration propulsion. The size of the cartridge may affect the suitability of the packaging technique. Thus, for larger cartridges a greater variety of electronics packaging techniques may be rendered feasible. Many possibilities for integrating electronics to accommodate such high accelerations are available depending on the desired size and cost. One such method includes small components through-hole mounted to a stiffened wiring board and embedded in encapsulant, such as described in "Printed Circuits Handbook," edited by Clyde F. Coombs, Jr., published by McGraw-Hill (1979), and herein incorporated by reference. Such printed wiring board (PWB) methods are low cost but may not achieve the miniaturization desired for some small sized cartridges. Yet another packaging technique involves surface mount (SMT) PWB's, such as described in section 3.4 of "Circuits, Interconnections and Packaging for VLSI," written by H.B. Bakoglu, available from Addison-Wesley (1990), and herein incorporated by reference. The SMT approach would permit a smaller volume for the electronics due to the use of physically smaller parts or electronic components. Likewise, a single integrated circuit monolithic chip may be fabricated for this purpose. In all of these embodiments, the electronics or components should be oriented substantially perpendicular to the anticipated direction of motion of the cartridge to reduce the effect of shear forces that might result in component interconnect or interconnection separation and thus device failure.

Likewise, technologies for fabricating multi-chip modules (MCM) may be employed, such as a chip and wire approach employed by nCHIP, Inc., described in International Conference on MultiChip Modules (ICMCM) Proceedings, 1992, herein incorporated by reference. In this approach, it may be desirable to pot or cover the bonds by an encapsulation method to provide protection from an acceleration force. Another MCM approach is the General Electric Co. developed technology regarding high density interconnect (HDI) multi-chip module packaging. GE HDI provides the capability to place integrated circuit components or chips in close physical proximity on a substrate, the substrate and components or chips being overlaid with one or more layers, each layer comprising a dielectric polymer film underlying a metallization interconnect. Various features and aspects of GE HDI multichip module packaging are described and explained in "Flexible HDI Structure and Flexibly Interconnected System," by Eichelberger et al., U.S. application Ser. No. 07/865,786, filed Apr. 7, 1992; "Integrated Circuit Chip Placement in a High Density Interconnect Structure," by Marcinkiewicz et al., U.S. application Ser. No. 07/962,449, filed Oct. 16, 1992; "High Density Interconnect Structure with Top Mounted Components," by Wojnarowski et al., allowed U.S. application Ser. No. 07/504,749, filed Apr. 5, 1990; "Integration of Pin-Mounted Components into HDI Structures," by Wojnarowski et al., U.S. application Ser. No. 07/904,930, filed Jun. 26, 1992; "Thinning of Integrated Circuit Chips for Lightweight Packaged Electronic Systems and Systems Resulting Therefrom," by Wojnarowski, U.S. application Ser. No. 07/962,379, filed Oct. 16, 1992; U.S. Pat. No. 4,933,042, "Method for Packaging Integrated Circuit Chips Employing a Polymer Film Overlay Layer," by Eichelberger et al., issued Jun. 12, 1990; U.S. Pat. No. 5,161,093, "Multiple Lamination High Density Interconnect Process and Structure Employing a Variable Crosslinking Adhesive," by Gorczyca et al., issued Nov. 3, 1992; U.S. Pat. No. 4,894,115, "Laser Beam Scanning Method for Forming Via Holes in Polymer Materials," by Eichelberger et al., issued Jan. 16, 1990, U.S. Pat. No. 4,835,704, "Adaptive Lithography System to Provide High Density Interconnect," by Eichelberger et al, issued May 30, 1989; and U.S. Pat. No. 4,783,695 "Multichip Integrated Circuit Packaging Configuration and Method," by Eichelberger et al., issued Nov. 8, 1988, all of the foregoing assigned to the assignee of the present invention and herein incorporated by reference. It will be appreciated that the invention is not limited in scope to only HDI module packaging; however, HDI modules have been shown in testing to have the capability to withstand possible environmental effects such as might occur to a munitions cartridge transmitter in accordance with the invention, including accelerations of 175,000 G's applied in testing by a centrifuge and 110,000 G's applied in testing by a gas gun, both of these upper limits being imposed by the test equipment. See, for example, "Electronic Systems Disposed in a High force Environment," by Wojnarowski, et al., U.S. application Ser. No. 07/936,712, filed Aug. 26, 1992, continuation of U.S. application Ser. No. 07/586,330, filed Sep. 18, 1990, continuation of U.S. application Ser. No. 07/374,890, filed Jul. 3, 1989, all of the foregoing assigned to the assignee of the present invention and herein incorporated by reference. Another advantage of utilizing HDI multichip module packaging techniques is that it provides the capability to interconnect devices responding to a variety of electrical signals, such as digital signals, analog signals and electrical signals useful for radio frequency transmission, such as previously described.

A number of other embodiments for power supply 210 are also possible. For example, a piezoelectric device may be coupled to a device for storing electrical energy, such as a capacitor. Thus, the propelling force on the munitions cartridge transmitter may produce electrical energy by application to the piezoelectric cell. The energy produced may then be stored, such as in the capacitor, for utilization by the transmitter and generator.

Another embodiment may involve the use of a conventional reserve battery configuration. Such batteries use highly active component materials to obtain a high energy power output at low temperatures, but are designed in a "reserved" configuration to withstand deterioration in storage and to eliminate the risk of self-discharge prior to use. The use of a sabot jacket, as previously described, provides an additional advantage in that it may prevent leakage of the chemical components of the reserve battery and isolate those chemical components from powder external to the cartridge or from sparks due to premature firing. Such batteries are often used in applications such as missiles, shells, torpedoes and other weapons systems as described in "Classification of Reserve Batteries," by David Linden in *Handbook of Batteries and Fuel Cells*, p. 33-4 to p. 33-10, David Linden, Editor, McGraw-Hill (1984), herein incorporated by reference. In such a reserve structure, one of the key components of the cell or battery is separated from the remainder of the cell until activation. Thus, in this inert condition, chemical reaction between the cell components, that is self-discharge, is prevented and the battery is capable of long-term storage.

Two types of reserve batteries should provide satisfactory performance when incorporated in a munitions cartridge transmitter in accordance with the invention. One type is an electrolyte activated reserve battery and the other is a thermal battery. In an electrolyte activated battery, the electrolyte storage and the activation mechanism are contained within the overall battery structure, and the electrolyte is provided to the active electrochemical components by remotely activating the activation mechanism. A trigger for such activation may be a mechanical or electrical impulse such as the force or acceleration accompanying the firing or propelling of the munitions cartridge transmitter when emitted from a cartridge propelling device. This may be accomplished, for example, by a pin piercing or shattering the surface of a reservoir storing the electrolyte. Such activation may be completed rapidly if required, usually in less than one second.

A lithium anode electrochemical system constitutes a particular electrolyte activated battery that has been developed for use in a reserve configuration to take advantage of the high energy density and low temperatures of such batteries. These cells may use either an organic electrolyte or a nonaqueous inorganic electrolyte because of the reactivity of lithium in aqueous electrolytes. One advantage of such batteries is that the reserve structure provides the capability of substantially no capacity loss even after storage periods in an inactive state for years. Nonetheless, as will be appreciated by one skilled in the art, a penalty in the resulting energy density may occur from the use of these batteries due to the need for the activation device and a separate electrolyte reservoir.

The table below provides some parameters of a particular lithium/thionyl chloride battery. Desirable features of these batteries include an operating temperature range of approximately $-55°$ C. to approximately $70°$ C., a ten to twenty year storage life in an unactivated state, high reliability, a rapid rise in voltage after initiation with a substantially flat discharge voltage profile, the ability to withstand acceleration shocks up to 200,000 G's and spins up to 10,000 rpm's and an operating life extending from several seconds up to many hours, depending upon the particular embodiment.

TABLE 1

| Battery type | Voltage (V) | Volume ($cm^3$) | Energy Density (Whr/$cm^3$) |
|---|---|---|---|
| Lithium(Li/SoCl$_2$) | 15 | 2.6 | 0.34 |
| Thermal (LiCl-KCl-CaCrO$_4$) | 45 | 83 | 0.023 |
| Munitions Cartridge Power Supply | 3 | 0.38 | 0.0013 |

One particular embodiment of a thionyl chloride reserve cell that may be suitable for use in a munitions cartridge transmitter in accordance with the invention has been fabricated by Eagle-Picher Industries, Inc., P.O. Box 47, Joplin, Mo. 64802, and is designated as part GAP-9218. This reserve cell has a diameter of approximately 0.219 inches and height of approximately 0.200 inches, which should be small enough for inclusion inside a 9 mm round sized cartridge. The cell voltage rise-time is less than 0.4 seconds and is activated by a force of less than 10 lbs. applied to its base plate. This cell will produce a current of approximately 10 mAmps at approximately 3.1 volts for at least around 3 minutes.

Likewise, a thermal or heat activated reserve battery may also be employed in an embodiment of a munitions cartridge transmitter in accordance with the invention. Furthermore, this type of battery or power supply may be employed in a flare and flare pistol configuration in which a heat producing flare may provide sufficient heat to activate the battery, as described hereinafter. In the context of this invention, the term "thermal battery" does not refer to a single electrochemical system, but to a family of batteries using different electrochemical systems. Embodiments of such batteries may employ a salt electrolyte which is solid and hence unconductive at normal storage temperatures when the battery should be inactive. The battery is then activated by heating it to a temperature sufficiently high to melt the electrolyte thus making it ionically conductive and permitting the flow of current, such as disclosed in "Thermal Batteries" by F. Tepper and D. Yalom, Page 40-1 to 40-18 in Handbook of Batteries and Fuel Cells, D. Linden, Ed., McGraw-Hill, (1984), herein incorporated by reference. The heat source and activating mechanism, which may be set off by electrical or mechanical means, such as a fusable link or the previously described pin and reservoir activated by the acceleration accompanying the motion of the cartridge, may be built into the battery in a compact configuration to give rapid activation. In the inactive state, the thermal battery may be stored for periods of twenty years or more. Likewise, the operational, that is post activation life, ranges from seconds for high power pulse batteries, to more than one hour. The heat source is often inserted between cells in a series cell stack for rapid activation. Thus, the active materials, the electrolyte, and other battery components may be varied according to the performance desired. Specific designs and compositions of thermal batteries, some having volume as small as 1 to 3 $cm^3$ are given in the previously referenced work "Thermal Batteries".

Some of the advantages of the use of a thermal battery in the munitions cartridge transmitter include a long shelf life in a "ready-state" without degradation in performance, instant activation, high peak power, demonstrated reliability and ruggedness following long term storage at extreme ambient temperatures, little or no maintenance or servicing, and the capability for permanent installation in the cartridge. Nonetheless, as will be appreciated by one skilled in the art, thermal batteries may result in reduction in energy density due to design considerations required to achieve these characteristics and may result in higher manufacturing costs compared with other types of reserve batteries.

Table 1 in addition to providing typical characteristics regarding a lithium reserve battery also provides characteristics regarding a thermal reserve battery and the characteristics desired for a battery or power supply for a munitions cartridge transmitter in accordance with the invention. Table 1 thus illustrates that the desired energy density for the munitions cartridge transmitter is significantly lower than the energy density available from a lithium reserve or thermal battery. Thus, it should now be clear to one skilled in the art that either of these types of batteries may provide adequate power and energy to operate the transmitter and electronics, while permitting miniaturization of the power supply to the desired volume to fit within the munitions cartridge housing, such as in a space of a diameter of 7 centimeters, and 1 centimeter in height providing a volume of about 0.38 centimeters$^3$. For embodiments of a munitions cartridge transmitter larger than 9 mm, the capability to provide sufficient power is likewise available. Despite the long shelf life of these reserve batteries, it may also be desirable in some situations to configure the munitions transmitter cartridge so that it is rechargeable after extended periods of inactivation.

While only certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A munitions cartridge transmitter for emitting an electromagnetic signal after discharge from a hand-held cartridge propelling device at a location to be substantially determined, said munitions cartridge transmitter comprising:
   a power supply for providing electrical energy after discharge of said cartridge from the cartridge propelling device;
   a signal generator coupled to said power supply for generating a signal from which said location can be substantially determined;
   an electromagnetic signal transmitter, coupled to said generator and said power supply, for emitting said signal provided by said signal generator;
   an antenna coupled to said transmitter; and
   a hollow cartridge housing for containing said generator, said transmitter, said power supply and said antenna, said cartridge housing having sufficiently miniaturized dimensions to fit in a barrel of said cartridge propelling device.

2. The munitions cartridge transmitter of claim 1, wherein said power supply comprises a thermal reserve battery.

3. The munitions cartridge transmitter of claim 1, wherein said power supply comprises an electrolyte reserve battery.

4. The munitions cartridge transmitter of claim 1, wherein said power supply comprises a piezoelectric cell coupled to an energy storage device.

5. The munitions cartridge transmitter of claim 1, wherein said transmitter comprises a balanced modulator coupled to a radio frequency carrier and an antenna driver.

6. The munitions cartridge transmitter of claim 1, further comprising means for deploying said antenna after discharge of said cartridge from the cartridge propelling device.

7. The munitions cartridge transmitter of claim 1, wherein said signal generator comprises a digital sequence generator.

8. The munitions cartridge transmitter of claim 7, wherein said generator comprises an N stage shift register.

9. The munitions cartridge transmitter of claim 8, wherein said generator further comprises a plurality of exclusive-OR gates digitally coupled to said shift register so as to provide a pseudorandom digital sequence output signal.

10. The munitions cartridge transmitter of claim 1, wherein said signal generator comprises an analog signal generator.

11. The munitions cartridge transmitter of claim 10, wherein said analog signal generator generates an analog signal having a relatively flat power spectral density over a predetermined range of frequencies.

12. The munitions cartridge transmitter of claim 1, wherein said housing is contained in a hollow shotgun shell prior to being discharged.

13. The munitions cartridge transmitter of claim 1, wherein said housing comprises a hollow bullet shell.

14. A munitions cartridge transmitter for emitting an electromagnetic signal after discharge from a hand-held cartridge propelling device at a location to be substantially determined, said munitions cartridge transmitter comprising:
   a power supply including two electrodes;
   a signal generator for generating a signal from which said location can be substantially determined;
   an electromagnetic signal transmitter, coupled to said signal generator, adapted to emit said signal provided by said generator;
   an antenna coupled to said transmitter;
   means for electrically insulating at least one of said two power supply electrodes from said signal generator and said transmitter until after discharge of said cartridge from the cartridge propelling device; and
   a hollow cartridge housing for containing said generator, said transmitter, said power supply, said antenna, and said insulating means, said cartridge housing having sufficiently miniaturized dimensions to fit in a barrel of said cartridge propelling device.

15. The munitions cartridge transmitter of claim 14, wherein said transmitter comprises a balanced modulator coupled to a radio frequency carrier and an antenna driver.

16. The munitions cartridge transmitter of claim 14, wherein said antenna is adapted to be deployed after discharge of said cartridge from the cartridge propelling device.

17. The munitions cartridge transmitter of claim 14, wherein said signal generator comprises a digital sequence generator.

18. The munitions cartridge transmitter of claim 17, wherein said generator comprises an N stage shift register.

19. The munitions cartridge transmitter of claim 18, wherein said generator further comprises a plurality of exclusive-OR gates digitally coupled to said shift register so as to provide a pseudorandom digital sequence output signal.

20. The munitions cartridge transmitter of claim 14, wherein said signal generator comprises an analog signal generator.

21. The munitions cartridge transmitter of claim 20, wherein said analog signal generator generates an analog signal having a relatively flat power spectral density over a predetermined range of frequencies.

22. The munitions cartridge transmitter of claim 14, wherein said housing is contained in a hollow shotgun shell prior to being discharged.

23. The munitions cartridge transmitter of claim 14, wherein said housing comprises a hollow bullet shell.

24. The munitions cartridge transmitter of claim 14, wherein said transmitter and said generator are incorporated into a single monolithic integrated circuit chip having at least one metal interconnection pad on the surface thereof;
   said power supply having said at least one electrode oriented in said cartridge housing facing said at least one interconnection pad, said one electrode forming a metal land raised above the surface of said power supply;
   said insulating means comprising a crushable doughnut shaped spacer comprised of a nonresilient insulating material, said spacer having a through-hole of sufficient size to receive said one electrode, said insulating means being interposed between said power supply and said chip to prevent direct physical contact between said one electrode and said at least one interconnection pad.

25. The munitions cartridge transmitter of claim 14, wherein said transmitter and said signal generator are incorporated into a single multichip module integrated circuit having at least one metal interconnection pad on the surface thereof;

said power supply having said at least one electrode oriented in said cartridge housing facing said at least one interconnection pad, said one electrode forming a metal land raised above the surface of said power supply;

said insulating means comprising a crushable doughnut shaped spacer comprised of a nonresilient insulating material, said spacer having a through-hole of sufficient size to receive said one electrode, said insulating means being interposed between said power supply and said module to prevent direct physical contact between said one electrode and said at least one interconnection pad.

* * * * *